(12) United States Patent
Hoelzel et al.

(10) Patent No.: US 9,126,640 B2
(45) Date of Patent: Sep. 8, 2015

(54) AIR GUIDING DEVICE FOR A MOTOR VEHICLE

(71) Applicants: Dr. Ing. h.c. F. Porsche Aktiengesellschaft, Stuttgart (DE); Apollo Vredestein B.V., RD-Enschede (NL)

(72) Inventors: Steffen Hoelzel, Eberdingen (DE); Bjorn Foerster, Wurmberg (DE); Gerard Nijman, AV-Losser (NL); Mike Ludovica Karel Peeters, Vlimmeren (BE); Louis-Phillippe Antoine Eugene Maria Reuvekamp, GE-Enschede (NL); Guido Berge, Wedel (DE)

(73) Assignees: Dr. Ing. h.c.F. Porsche Aktiengesellschaft (DE); Apollo Vredestein B.V. (NL)

( * ) Notice: Subject to any disclaimer, the term of this patent is extended or adjusted under 35 U.S.C. 154(b) by 2 days.

(21) Appl. No.: 14/061,079

(22) Filed: Oct. 23, 2013

(65) Prior Publication Data

US 2014/0175831 A1    Jun. 26, 2014

(30) Foreign Application Priority Data

Oct. 23, 2012    (DE) .......................... 10 2012 020 739

(51) Int. Cl.
*B62D 35/00*    (2006.01)
(52) U.S. Cl.
CPC .................................... *B62D 35/005* (2013.01)
(58) Field of Classification Search
CPC .............................. B62D 35/005; B62D 35/00
USPC ................................ 296/180.1, 193.09, 180.3
See application file for complete search history.

(56) References Cited

U.S. PATENT DOCUMENTS

| 7,040,690 B2 * | 5/2006 | Soja et al. ................... 296/180.5 |
| 2003/0116996 A1 | 6/2003 | Soja et al. |

(Continued)

FOREIGN PATENT DOCUMENTS

| DE | 101 60 748 | 6/2003 |
| DE | 103 25 652 | 12/2004 |
| DE | 103 25 653 | 12/2004 |

(Continued)

OTHER PUBLICATIONS

International Search Report of Jun. 19, 2013.

*Primary Examiner* — Glenn Dayoan
*Assistant Examiner* — Dana Ivey
(74) *Attorney, Agent, or Firm* — Gerald E. Hespos; Michael J. Porco; Matthew T. Hespos

(57) ABSTRACT

An air guiding device (10) for a motor vehicle, with a spoiler lip (12) extending in the transverse direction (FQ) of the vehicle, and with a pneumatic actuating device (28) for the spoiler lip (12), with the aid of which actuating device the spoiler lip (12) is shiftable between a retracted rest position and an extended position, wherein the pneumatic actuating device (28) has a pneumatic actuator (30) which is fillable with or is emptiable of air, wherein the pneumatic actuator (30) is divided in the transverse direction (FQ) of the vehicle into a plurality of zones (40, 42, 44), wherein the pneumatic actuator (30) has a plurality of air-fillable chambers (46, 48, 50) in each zone (40, 42, 44), and wherein the chambers (46, 48, 50) are fillable with or are emptiable of air in a manner individual to the zones.

11 Claims, 5 Drawing Sheets

(56) References Cited

U.S. PATENT DOCUMENTS

2005/0012359 A1   1/2005   Jungert
2005/0017541 A1   1/2005   Jungert

FOREIGN PATENT DOCUMENTS

| DE | 10 2006 060 672 | 6/2008 |
|---|---|---|
| WO | 2006/115988 | 11/2006 |

* cited by examiner

AIR GUIDING DEVICE FOR A MOTOR VEHICLE

CROSS REFERENCE TO RELATED APPLICATIONS

This application claims priority under 35 USC 119 to German Patent Appl. No. 10 2012 020 739.5 filed on Oct. 23, 2012, the entire disclosure of which is incorporated herein by reference.

BACKGROUND

1. Field of the Invention

The invention relates to an air guiding device that has a spoiler lip and that is mountable on a front part of a motor vehicle via an adapter. A pneumatic actuating device shifts the spoiler lip between a retracted rest position and an extended position.

2. Description of the Related Art

US 2003/0116996 and US 2005/0012359 disclose spoiler devices that have a spoiler lip extending in the transverse direction of the vehicle at the front of the vehicle. The spoiler lip is made of an elastomer and a pneumatic actuating device moves the spoiler lip between a retracted rest position and an extended maximum position to optimize an aerodynamic effect with respect to output values of the motor vehicle. The pneumatic actuating device of the air guiding device known from the prior art comprises a pneumatic actuator with chambers that can be filled or emptied to transfer the spoiler lip between the retracted rest position and the extended maximum position. The elastomer of the spoiler lip is deformed elastically during the filling operation, thus building up a restoring force, which, during the emptying operation, returns the spoiler lip back in the direction of the rest position again.

The spoiler lip of the prior art air guiding device reliably can be transferred between the retracted rest position and the extended maximum position. However, the air guiding devices known from the prior art have a number of disadvantages. For example, the air guiding devices known from the prior art can be transferred only to a limited extent into intermediate positions between the retracted rest position and the extended maximum position.

Furthermore, in the extended state of the spoiler lip, dents, which adversely affect the esthetic overall impression of the air guiding device, can form on the spoiler lip. There also is the risk that the prior art air guiding devices will be damaged during operation. Furthermore, a secure fixing of the spoiler lip in the retracted rest position has caused difficulties.

The object of the present invention to provide a novel air guiding device for a motor vehicle.

SUMMARY OF THE INVENTION

According to the first aspect of the invention, the pneumatic actuator is divided in the transverse direction of the vehicle into a plurality of zones. In each zone, the chambers of the actuator can be filled with and emptied of air in a manner individual to the zones. Hence, a specific actuation of different intermediate positions between the retracted rest position and the extended maximum position is possible. For example, it is possible, only in the outer zones, to fill the chambers of the pneumatic actuator with air, while not filling the chambers of the pneumatic actuator in one or more central zones with compressed air. Thus, an intermediate position between the retracted rest position and the extended maximum position can be approached in a particularly advantageous manner.

The zones of the pneumatic actuator preferably are directly adjacent to one another in such a manner that the actuator extends continuously over the entire width of the spoiler lip. A pneumatic actuator that extends continuously over the entire width of the spoiler lip provides an advantageous optical overall impression of the extended spoiler lip and the extending operation of the spoiler lip can be improved.

The pneumatic actuator preferably is divided in the transverse direction of the vehicle into at least two, in particular into at least three, zones and each zone preferably has at least three, in particular each having at least four, chambers. The subdivision of the pneumatic actuator into three zones each having five chambers is particularly preferred.

The spoiler lip preferably is fastened at an end opposite a free end thereof to an adapter. In the region of each zone, a first outer chamber of the pneumatic actuator is connected to the adapter and a second outer chamber of the pneumatic actuator is connected to the free end of the spoiler lip. Inner chambers between the outer chambers are supported exclusively on the respectively adjacent outer and/or inner chambers. The connection of the chambers of the pneumatic actuator in the corresponding zones to the spoiler lip and to the adapter ensures a particularly advantageous optical overall impression of the spoiler lip in the extended position of the air guiding device. There is no risk of further chambers coming to bear in the extended state against the spoiler lip and thereby bruising the spoiler lip on the visible side in the extended state.

The pneumatic actuator preferably has air-fillable chambers. The chambers are manufactured from an inner, gas-tight layer and an outer protective layer. If the pneumatic actuator and the chambers are manufactured from the inner, gas-tight layer and from the outer protective layer, there is no risk of damage during operation. The outer protective layer protects the chambers of the pneumatic actuator against operationally induced damage in the extended state of the spoiler lip during a motor vehicle journey.

The spoiler lip and an adapter device on which the spoiler lip acts at one end which is opposite a free end are assigned magnetically active holding elements, with the aid of which the spoiler lip is held on the adapter in the retracted rest position, wherein the magnetically active holding elements are covered by plastic. The spoiler lip can be held securely and reliably in the retracted rest position on the adapter device via the magnets. The covering of the magnets means that there is no risk of same being damaged during operation.

Preferred embodiments of the invention are explained in more detail, without being restricted thereto, with reference to the drawing.

DETAILED DESCRIPTION OF THE PREFERRED EMBODIMENTS

Figure 1:
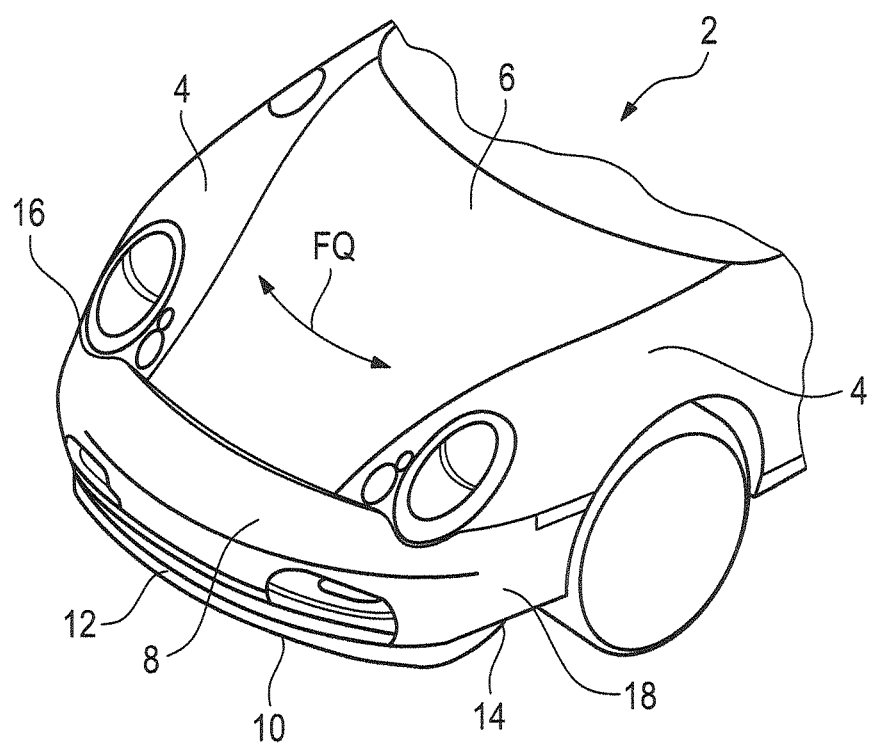
FIG. 1 shows a perspective view of a front region of a motor vehicle with an air guiding device according to the invention.

FIG. 1 shows a front section 2 of a motor vehicle. The front section 2 comprises lateral wings 4, an engine hood 6 arranged in between, or a trunk lid arranged in between, and a front part 8 mounted in front of the engine hood 6 and the wings 4. The front part 8 forms the front end of the front portion 2 of the motor vehicle.

An air guiding device 10 according to the invention, of which only a spoiler lip 12 can be seen in the present view, is then arranged below the front part 8.

In the present view, the spoiler lip 12 is in a retracted rest position. The spoiler lip 12 extends substantially in the transverse direction FQ of the vehicle and ends with free ends 14, 16 on the lower side of lateral longitudinal sections 18 of the front part 8.

Figure 2:
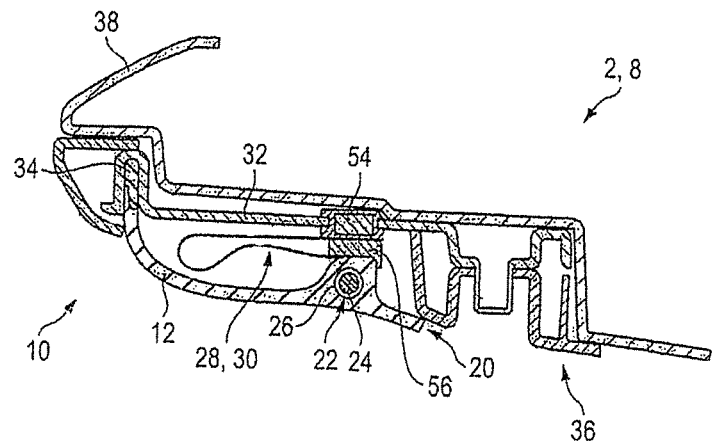
FIG. 2 shows a sectional view of FIG. 1 in the region of the air guiding device according to the invention from FIG. 1, in a first state of the air guiding device.
Figure 3:
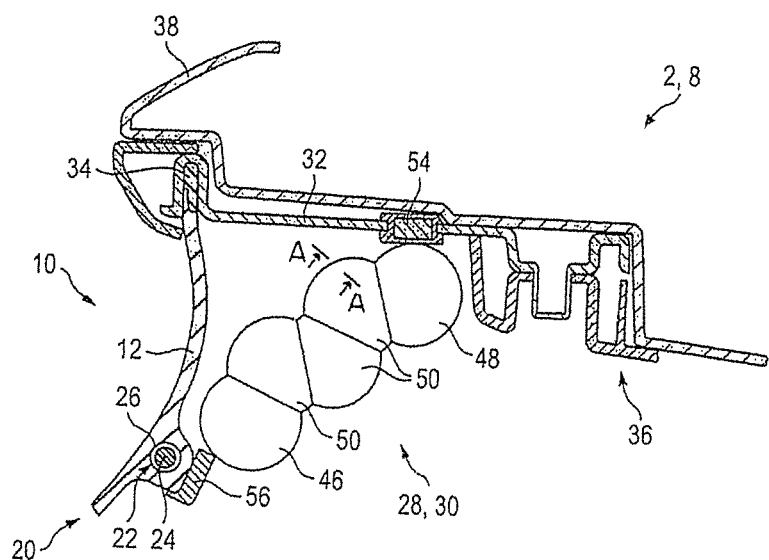
FIG. 3 shows the sectional view of FIG. 2 in a second state of the air guiding device.

FIGS. 2 and 3 show a cross section through the front section 2 of the motor vehicle from FIG. 1 in the region of the air guiding device 10 according to the invention, wherein the cross sections in FIG. 2 and FIG. 3 run in the longitudinal direction of the motor vehicle. FIG. 2 shows the air guiding device 10 in a retracted, horizontal rest position state, and FIG. 3 shows same in an extended, vertical state.

The spoiler lip 12 of the air guiding device 10 according to the invention is preferably manufactured from an elastomer and, during the transfer of same from the rest position shown into an extended position, is subject to a change in length in the transverse direction FQ of the vehicle.

Adjacent to a free end 20 of the spoiler lip 12, the latter has a channel 22 which extends in the transverse direction FQ of the vehicle and into which a flexurally elastic rod member 24 is inserted. The flexurally elastic rod member 24 is guided movably in a guide device 26, wherein the guide device 26 preferably consists of a longitudinally elastic weather strip extending over the entire length of the spoiler lip.

The flexurally elastic rod member 24 is preferably manufactured from a PTFE, a GFRP-covered PTFE or from a different plastic, so that same is able to be guided in the guide device 26 with minimal static friction and sliding friction.

In order to shift the spoiler lip 12 between the retracted rest position and an extended position, the air guiding device 10 has a pneumatic actuating device 28. Such a pneumatic actuating device 28 has a pneumatic actuator 30 which is fillable with or is emptiable of air.

The air guiding device 10 has an adapter device 32, wherein the spoiler lip 12 is mounted by a vulcanized-on end 34, which is opposite the free end 20, on the adapter device 32.

Said vulcanized-on end 34 of the spoiler lip 12 and the adapter device 32 are preferably connected via a clip connection.

In addition to the adapter device 32, the air guiding device 10 furthermore comprises a fastening device 36, wherein, firstly, the adapter device 32 and the fastening device 36 are connected to each other, and wherein, secondly, the air guiding device 10 is connectable via the adapter device 32 and the fastening device 36 to the front panel 38 of the front part 8 of the motor vehicle.

Figure 4:
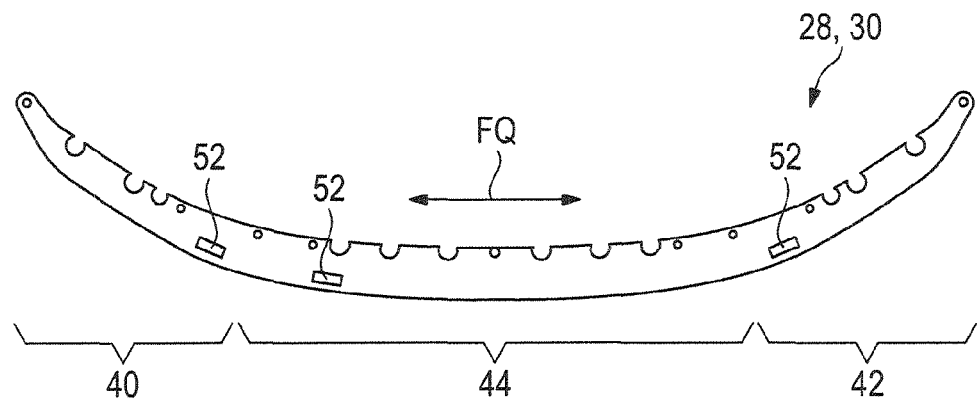
FIG. 4 shows a top view of the air guiding device according to the invention.
Figure 5:
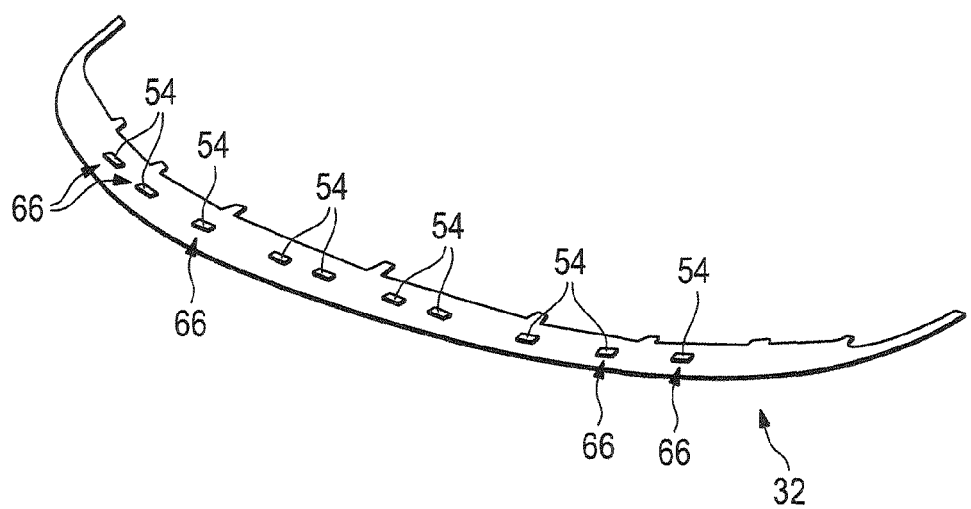
FIG. 5 shows a perspective view of an adapter device of the air guiding device according to the invention.

According to a first aspect of the invention present here, the pneumatic actuator 30 of the pneumatic actuating device 28 is divided in the transverse direction FQ of the vehicle into a plurality of zones 40, 42 and 44, wherein, in the exemplary embodiment shown in FIG. 4, the pneumatic actuator 30 is divided into three zones, namely the two outer zones 40, 42 and into the central zone 44.

According to the first aspect of the invention present here, the pneumatic actuator 30 has a plurality of air-fillable chambers 46, 48 and 50 in each zone 40, 42 and 44 of said actuator, wherein, in the exemplary embodiment shown, the actuator 30 has five chambers in each of the zones 40, 42 and 44, namely, in each case, the two outer chambers 46 and 48 and three central chambers 50.

Although the configuration of the invention, in which the pneumatic actuator 30 is divided into the three zones 40, 42 and 44 each having five chambers 46, 48 and 50 in the three zones 40, 42 and 44 is preferred, it is also possible to subdivide the actuator 30 into only two zones or into more than three zones. It is likewise possible for the pneumatic actuator 30 to have three, four or more than five chambers in each zone 40, 42 and 44.

Furthermore, a different number of chambers can be used in each zone 40, 42 and 44.

The chambers 46, 48 and 50 of each zone 40, 42 and 44 are fillable with or are emptiable of air independently of the chambers 46, 48 and 50 of the other zones 40, 42 and 44 and, accordingly, in a manner individual to the zones, for which purpose each zone 40, 42 and 44 is assigned an individual pneumatic connection 52 for the zone-individual filling or emptying of the corresponding chambers 46, 48 and 50 of the pneumatic actuator 30 in the respective zone 40, 42 and 44.

As can best be gathered from FIG. 3, a first outer chamber 48 of the pneumatic actuator 30 is connected to the adapter device 32 and a second outer chamber 46 of the pneumatic actuator 30 is connected to the spoiler lip 12 in the region of the free end 20 thereof adjacent to the section in which the rod member 24 or the guide device 26 run.

The inner chambers 50 which are positioned between said two outer chambers 46 and 48 are supported here exclusively on the respectively adjacent chambers, namely on the adjacent outer chambers 46 and 48 and/or on the respectively adjacent inner chambers 50.

Not in any extended position of the spoiler lip 12 is one of the chambers 50 supported on the spoiler lip 12 in a region between the free end 20 and the opposite end 34, via which the spoiler lip is fastened to the adapter device 32, and therefore, accordingly, the spoiler lip 12 is not bruised.

The pneumatic actuator 30 preferably extends continuously in the transverse direction FQ of the vehicle over the entire width of the spoiler lip 12, thus ensuring an optimum extension of the spoiler lip 12 into an operating position and an optimum retraction of same into the rest position. By means of said cohesive, continuous extension of the pneumatic actuator 30, dirt can be prevented from settling between chambers of said actuator. A satisfactory extension and retraction of the spoiler lip can thereby be ensured.

According to the first aspect of the invention present here, it is accordingly provided to subdivide the pneumatic actuator 30 of the pneumatic actuating device 28 in the transverse direction FQ of the vehicle into a plurality of zones, preferably three zones, 40, 42 and 44, wherein the pneumatic actuator 30 has a plurality of pneumatically fillable chambers, preferably five, 46, 48 and 50 in each of the zones 40, 42 and 44. The chambers 46, 48 and 50 of the pneumatic actuator 30 are fillable with or are emptiable of air in each zone 40, 42 and 44 thereof in a manner individual to the zones, wherein, in each zone 40, 42 and 44 only one of the chambers 46 is connected to the spoiler lip 12. The chambers 50, 48 connected to said chamber 46 do not come to bear against the spoiler lip 12, specifically independently of the zone-individual filling or emptying of said chamber with compressed air.

The individual chambers 46, 48 and 50 of the pneumatic actuator 30 are formed in the shape of a mattress.

A further advantage of the first aspect of the invention present here consists in that the volume of the chambers 46, 48 and 50, and therefore of the pneumatic actuator 30, can be minimized. Accordingly, only relatively little compressed air is required for extending the spoiler lip 12, and therefore relatively small compressors can be used for supplying the compressed air.

According to a second aspect of the invention, the chambers 46, 48 and 50 of the pneumatic actuator 30 preferably each consist of an inner, gas-tight layer 80 and of an outer protective layer 82. The inner gas-tight layer 80 is preferably a layer composed of a thermoplastic elastomer, and the outer protective layer 82 is a layer composed of a nylon fabric. The outer protective layer 82 composed of the nylon fabric prevents the pneumatic actuator 30, namely the chambers of same, from being able to be damaged in the extended position during the motor vehicle journey.

The individual chambers 46, 48 and 50 are interconnected, preferably by welding, within each zone 40, 42 and 44. The chambers of the individual zones 40, 42 and 44 are likewise interconnected, preferably via a welding operation, in order thereby to provide the pneumatic actuator 30 extending over the entire width in the transverse direction of the vehicle.

In order to hold and to fix the spoiler lip in the retracted position (see FIG. 2), according to a third aspect of the invention both the spoiler lip 12 and the adapter device 32 are assigned magnetically active holding elements 54 and 56.

The magnetically active holding elements 54 and 56 are preferably pairs of oppositely poled magnets or pairs consisting of a magnet and steel plates.

The magnetically active holding elements 54 and 56 are in each case covered by plastic in order to protect same against damage during operation and against corrosion.

Figure 6:
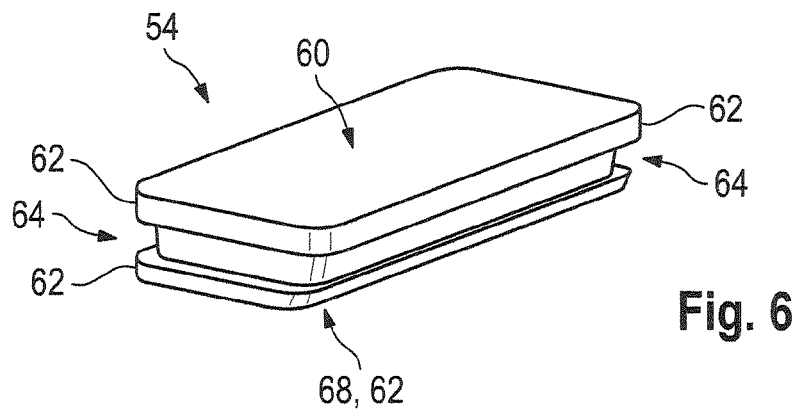
FIG. 6 shows a perspective view of a magnet assigned to the adapter device.
Figure 7:
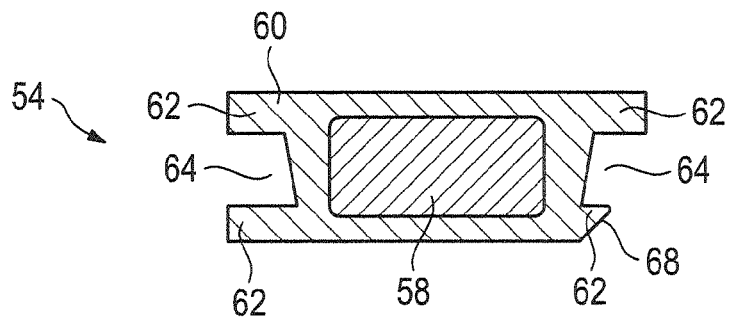
FIG. 7 shows a cross section through the magnet from FIG. 6.
Figure 8:
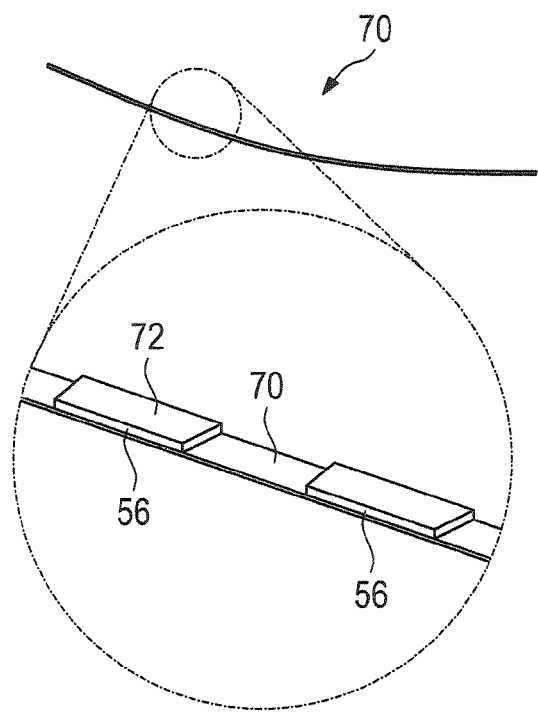
FIG. 8 shows details of a spoiler lip of the air guiding device according to the invention.
Figure 9:
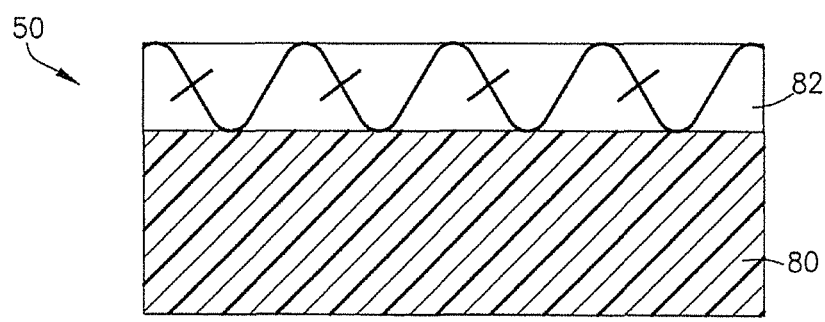
FIG. 9 shows a cross-section of e chamber taken along Line A-A in FIG. 3.

FIGS. 6 and 7 show different views of a magnetically active holding element 54 assigned to the adapter device 32, wherein said holding element comprises a magnet 58 which is covered by a plastic enclosure 60. The plastics enclosure 60 here forms projections 62 and grooves 64, via which the magnetically active holding elements 54 can be inserted into corresponding recesses 66 in the adapter device 43 and can be connected individually to the adapter device 32.

According to FIG. 7, at least one projection 62 of the plastics covering 60 of the magnet 58 has a bevel 68 which serves as an introduction aid for the insertion of same into the recesses 66 of the adapter device 32.

The magnetically active holding elements 56 assigned to the spoiler lip 12 are covered by a common plastics covering 72, which also extends between the covered, magnetically active holding elements 56, preferably with the formation of a strip-like formation 70, wherein said strip-like formation 70 can be mounted as a unit on the spoiler lip 12.

The strip-like formation 70 is preferably used for fixing the pneumatic actuator 30 to the spoiler lip 12.

The magnetic holding elements are preferably insert-molded with polyurethane. The respective covering 72 or 60 here is preferably relatively soft in order to ensure effective mechanical protection against impacts or scratching stresses when traveling over unevennesses in the carriageway.

What is claimed is:

1. An air guiding device for a motor vehicle, comprising:
   a spoiler lip extending in a transverse direction of the vehicle; and
   a pneumatic actuating device for shifting the spoiler lip between a retracted rest position and an extended position, the pneumatic actuating device having a pneumatic actuator that is fillable with or emptiable of air to shift the spoiler lip between the extended position and retracted rest position, respectively, the pneumatic actuator being divided in the transverse direction of the vehicle into a plurality of zones, each of the plurality of zones having a plurality of air-fillable chambers arranged in a direction normal to the transverse direction, wherein the chambers are fillable with or are emptiable of air in a manner individual to the zones.

2. The air guiding device of claim 1, wherein each of the plurality of zones of the pneumatic actuator directly adjacent to at least an other of the plurality of zones in such a manner that said actuator extends continuously over the entire width of the spoiler lip.

3. The air guiding device of claim 1, wherein the pneumatic actuator is divided in the transverse direction of the vehicle into at least two zones each having at least three chambers.

4. The air guiding device of claim 2, wherein the pneumatic actuator is divided in the transverse direction of the vehicle into at least three zones each having at least four chambers.

5. The air guiding device wherein claim 4, wherein the pneumatic actuator is divided in the transverse direction of the vehicle into three zones each having five chambers.

6. The air guiding device of claim 1, wherein the spoiler lip has a first end fastened to an adapter device and a free end opposite the first end, and wherein,
   the plurality of air-fillable chambers of each of the plurality of zones comprises at least first and second outer chambers arranged in the direcaton normal to the transverse direction of the vehicle and at least one inner chamber arranged between the first and second outer chambers,
   the first outer chamber is connected to the adapter device and the second outer chamber is connected in a region of the free end of the spoiler lip, and the at least one inner chamber is supported exclusively on chamber adjacent in the direction normal to the transverse direction.

7. An air guiding device for a motor vehicle, comprising:
   a spoiler lip extending in a transverse direction of the vehicle; and
   a pneumatic actuating device having a pneumatic actuator which is fillable with or is emptiable of air, to shift the spoiler lip between an extended position and a retracted rest position, respectively, the pneumatic actuator being divided into a plurality of zones arranged side-by-side in the transverse direction of the vehicle, each of the plurality of zones having a plurality of air-fillable chambers arranged in a direction normal to the transverse direction, wherein
   the chambers are fillable with or are emptiable of air in a manner individual to the zones, and
   each of the plurality of air-fillable chambers of the pneumatic actuator are manufactured from an inner, gas-tight layer and an outer protective layer.

8. The air guiding device of claim 7, characterized in that the gas-tight layer is manufactured from a thermoplastic elastomer and the protective layer is manufactured from a nylon fabric.

9. An air guiding device for a motor vehicle, comprising:
   a spoiler lip extending in a transverse direction of the vehicle; and a pneumatic actuating device having a pneumatic actuator which is fillable with or is emptiable of air to shift the spoiler lip between an extended position and a retracted rest position, respectively, wherein the spoiler lip has a first end fastened to an adapter device and a free end opposite the first end, and magnetically active holding elements are provied on the adapter and at the free end and are configured to hold the spoiler lip to the adapter device when the spoiler lip is in the retracted rest position, and the magnetically active holding elements are covered by plastic.

10. The air guiding device of claim 9, wherein the magnetically active holding elements assigned to the adapter device are covered with plastic in such a manner that the plastics covering forms projections and grooves via which said holding elements can be inserted into recesses in the adapter device and can be fastened individually to the adapter device.

11. The air guiding device of claim 10, wherein the magnetically active holding elements assigned to the adapter device are covered with plastic in such a manner that said holding elements are jointly mountable in the form of a strip-like formation on the spoiler lip.

\* \* \* \* \*